Jan. 6, 1925.

M. A. SMITH ET AL 1,522,150

MOLD FOR MAKING GLASS SPARK PLUG BUSHINGS

Filed Nov. 1, 1922

3 Sheets-Sheet 2

INVENTORS.
Maurice A. Smith and
Joseph Blaze
By Kay. Totten Brown,
Attorneys

Jan. 6, 1925.  
M. A. SMITH ET AL  
MOLD FOR MAKING GLASS SPARK PLUG BUSHINGS  
Filed Nov. 1, 1922

INVENTORS

Patented Jan. 6, 1925.

1,522,150

UNITED STATES PATENT OFFICE.

MAURICE A. SMITH AND JOSEPH BLAZE, OF JEANNETTE, PENNSYLVANIA, ASSIGNORS TO McKEE GLASS COMPANY, OF JEANNETTE, PENNSYLVANIA, A CORPORATION OF PENNSYLVANIA.

MOLD FOR MAKING GLASS SPARK-PLUG BUSHINGS.

Application filed November 1, 1922. Serial No. 598,425.

*To all whom it may concern:*

Be it known that we, MAURICE A. SMITH and JOSEPH BLAZE, citizens of the United States, and residents of Jeannette, in the county of Westmoreland and State of Pennsylvania, have invented a new and useful Improvement in Molds for Making Glass Spark-Plug Bushings; and we do hereby declare the following to be a full, clear, and exact description thereof.

Our invention relates to glass-molding machines, and it has special reference to machines for molding glass bushings for spark plugs.

The general object of our invention is to provide an improved molding machine wherein a plurality of tubular spark plug bushings may be molded simultaneously.

More specifically, the object of our invention is to provide a molding machine for tubular spark plug bushings which shall include a partible mold having a plurality of molding cavities and a plurality of plungers arranged to move vertically into and out of the molding cavities, together with means for cooling the plungers in the intervals between the molding operations.

Figure 1:
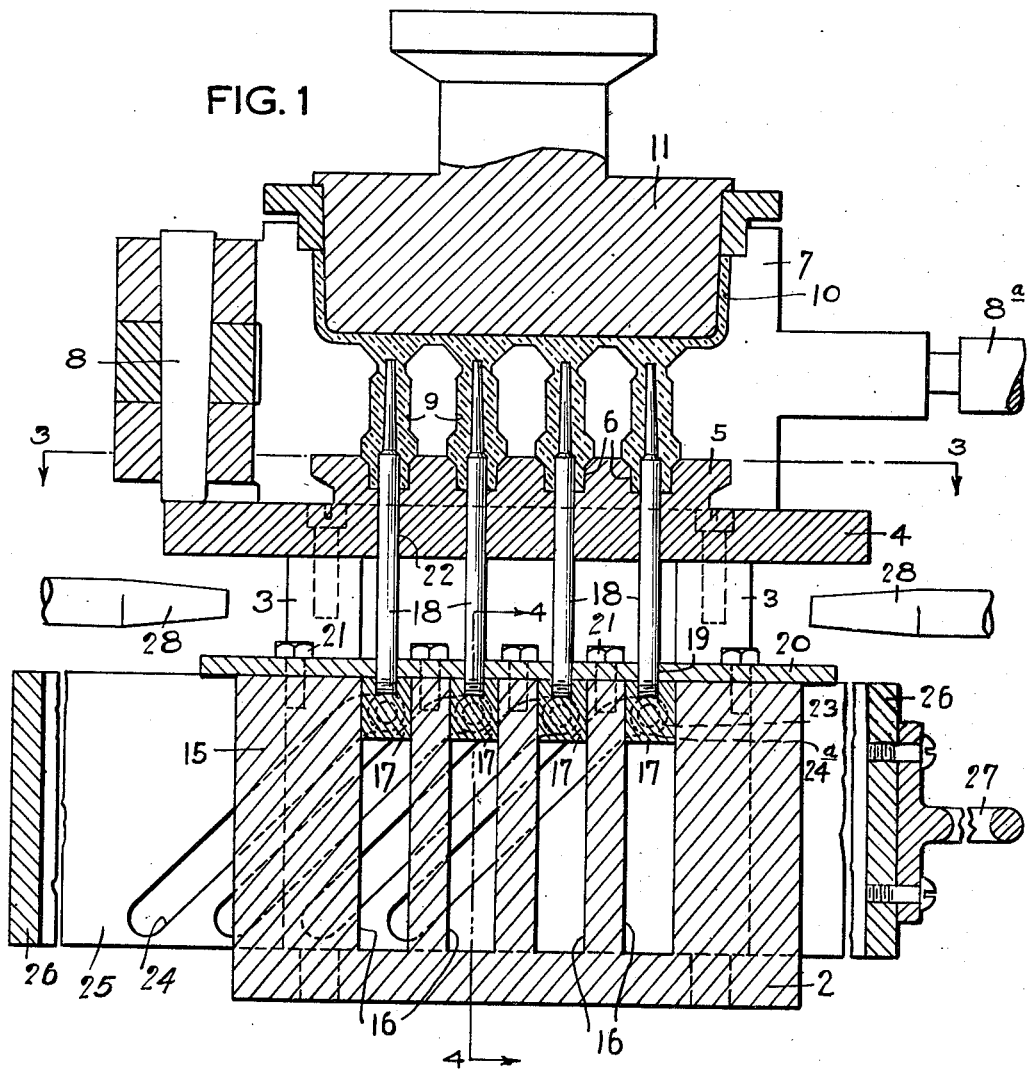
Figure 2:
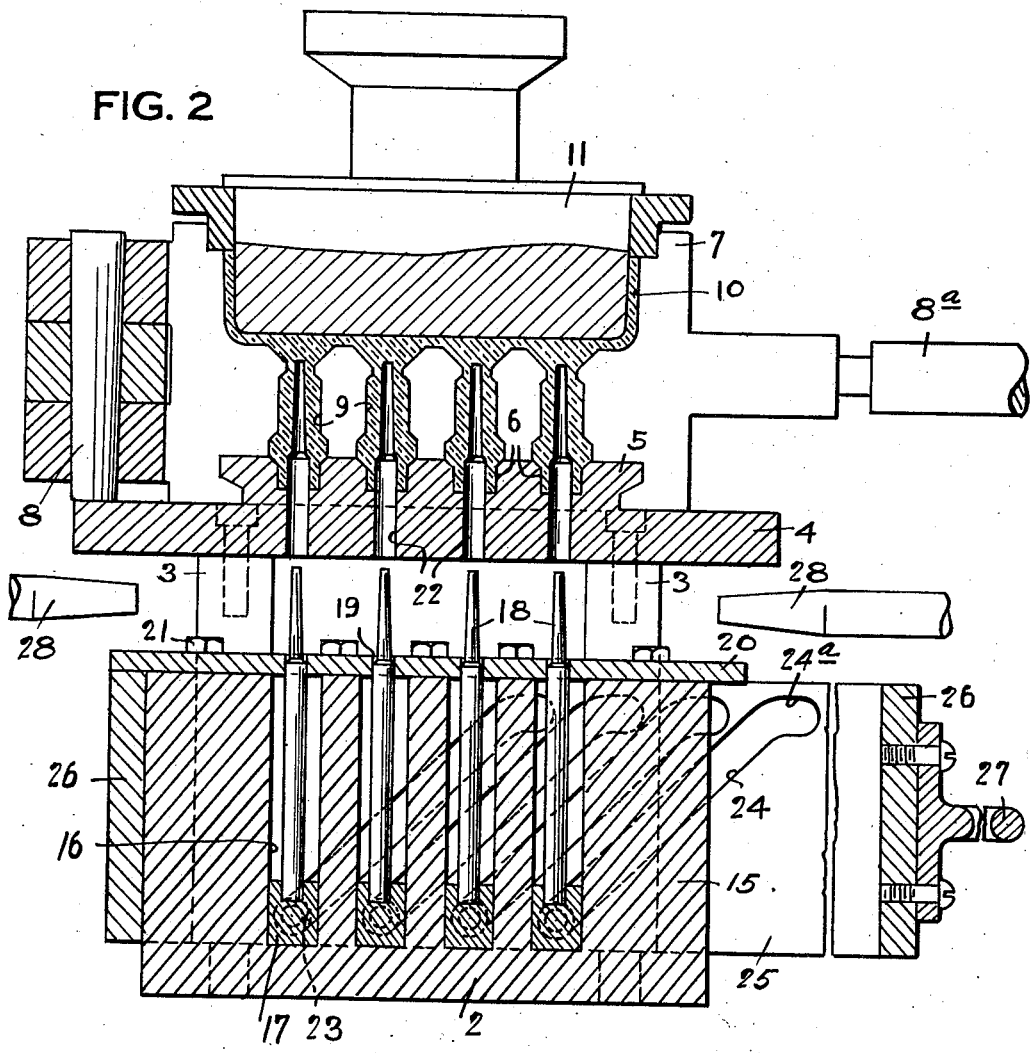
Figure 3:
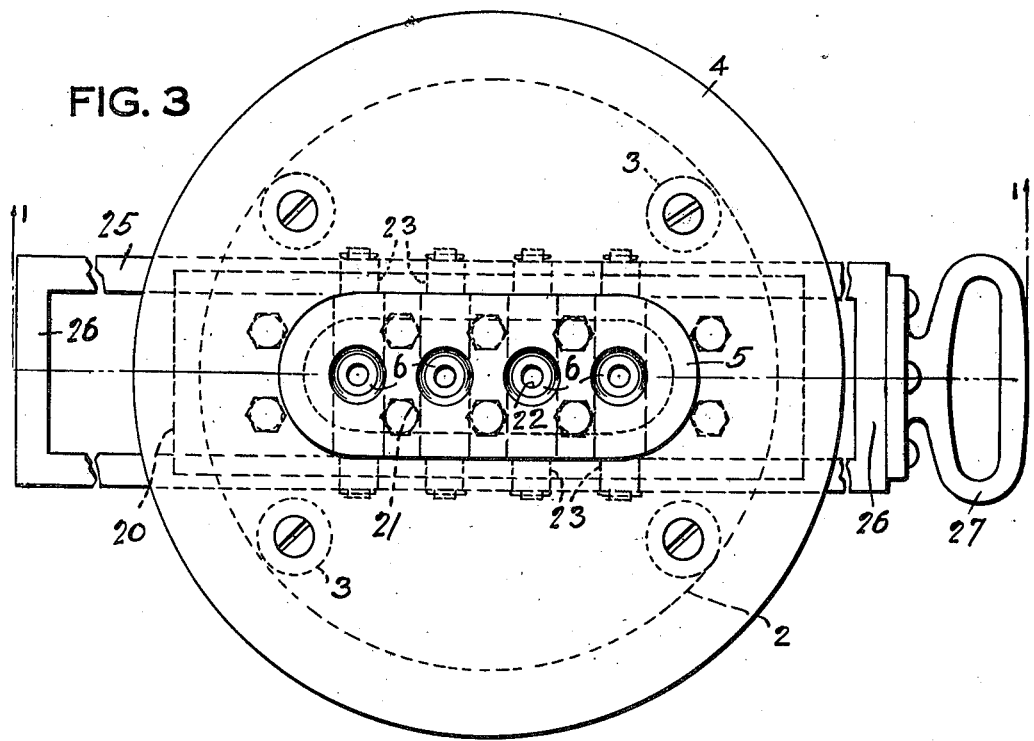
Figure 4:
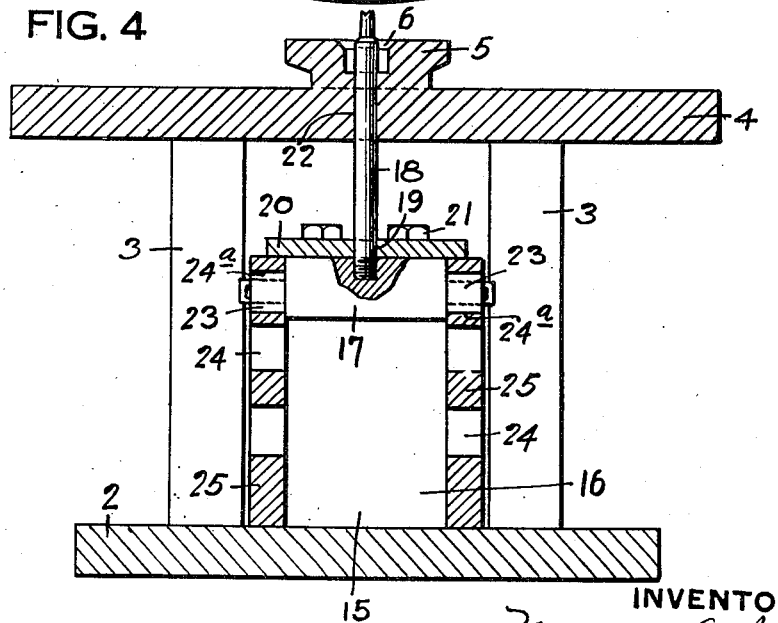

In the accompanying drawing, Fig. 1 is a vertical sectional view through a molding machine constructed in accordance with our invention, the section being taken centrally through the molding cavities; Fig. 2 is a similar vertical sectional view showing the plungers lowered after a set of bushings have been molded; Fig. 3 is a plan view of the mold table and plunger meachanism with the mold removed; and Fig. 4 is a vertical sectional view of a portion of the plunger mechanism, the section being taken substantially on the line 4—4, Fig. 1.

In the drawing, the numeral 2 indicates a base plate which may be circular or of any other desired form, and upon which are mounted four standards 3 which support a mold table 4. The mold table 4 carries a fixed mold section 5 having four cavities indicated at 6 for molding the lower ends of the bushings. The mold table 4 also carries a partible mold consisting of two sections 7 hinged together on a pivot pin 8. The mold sections 7 are provided with cavities 9 for molding the upper portions of the bushings, these cavities communicating with a larger cavity 10 which is of proper size and shape to admit a plunger 11 which is reciprocated vertically by any usual or desired means, not shown. The mold sections 7 have the usual handles 8ª for opening and closing the mold.

Mounted on the base 2 between the standards 3 is a stationary block 15 having four vertical slots 16 disposed directly below the mold cavities. A bar 17 is slidably mounted in each of the vertical slots 16 and each of the bars 17 carries a plunger 18 which is screwed into a threaded opening in the bar 17 midway between its ends, as shown in Fig. 4. The plungers 18 extend up through openings 19 in a cover plate 20 which is fastened to the top of the block 15 by means of screw bolts 21. The plungers 18 are also adapted to rise through openings 22 in the mold table 4 and to enter the mold cavities, as shown in Fig. 1, For the purpose of raising and lowering the plungers 18, rollers 23 are secured loosely to the ends of the bars 17, and these rollers are received in inclined slots 24 having horizontal upper portions 24ª, these slots being formed in a double slide which consists of a rectangular frame, the sides 25 of which are provided with the slots 24 and are arranged beside the stationary block 15. The side members 25 of the slide are connected at their ends by transverse members 26, and a handle 27 is attached to one of the transverse members 26 for reciprocating the slide lengthwise. When the slide is in the position shown in Fig. 2 the rollers 23 are at the lower ends of the inclined slots 24, and consequently the plungers 18 are in their lowest position. It will be observed that in this position the upper ends of the plungers are below the mold table 4. When the slide is moved from the position shown in Fig. 2 to the position shown in Fig. 1 the rollers 23 ride up in the slots 24, and into the horizontal portions 24ª of the slots, raising the bars 17 and the plungers 18 to the position in which the upper ends of the plungers are within the mold cavities.

In order to cool the upper ends of the plungers between the molding operations, air blasts are directed horizontally beneath the mold table 4 against the plungers. Nozzles 28 are indicated on the drawing for this purpose.

In molding glass bushings for spark plugs with the apparatus described above, the mold sections 7 are closed upon the stationary section 5 and the slide is moved to the position shown in Fig. 1 to bring the upper ends of the plungers 18 into the molding cavities. A gather of glass is then placed in the cavity 10 of the mold and the pressing plunger 11 is forced down into this cavity, thereby forcing the glass into the cavities 9 and 10 around the upper ends of the plungers 18. The surplus glass finds its way up into the space between the plunger 11 and the mold, as shown on Fig. 1. The slide is then operated to lower the plungers from the position shown in Fig. 1 to the position shown in Fig. 2, the plunger 11 is raised, the mold is opened, and the molded glass bushings are removed. The bushings are then cracked off from the adhering glass and their upper edges are ground.

The accompanying drawing shows the construction of a set of apparatus which is now in successful use. It will be understood, however, that various changes in the construction and arrangement of parts may be made without departing from our invention, the scope of which is indicated in the appended claims.

We claim as our invention:

1. A glass-molding apparatus comprising a mold having a plurality of molding cavities, separately mounted plungers adapted to reciprocate vertically into and out of said cavities, and means for simultaneously reciprocating all of said plungers.

2. Glass-molding apparatus comprising a mold having a plurality of molding cavities, and a plunger-receiving cavity communicating with all of said molding cavities, separately mounted plungers adapted to reciprocate vertically into and out of said mold cavities, and means for simultaneously reciprocating all of said plungers.

3. Glass-molding apparatus comprising a mold having a plurality of molding cavities, and a plunger-receiving cavity communicating with all of said molding cavities, separately mounted plungers adapted to be raised into said cavities and to be lowered out of said cavities, and means for simultaneously reciprocating all of said plungers.

4. Glass-molding apparatus comprising a mold table, a mold supported on said table and having a plurality of molding cavities, said table having openings in line with the said cavities, separately mounted plungers disposed beneath the said mold table and adapted to be raised through said openings into said cavities, and means for simultaneously raising the said plungers into said cavities and for simultaneously lowering said plungers to a position completely beneath said molding table.

5. Glass molding apparatus comprising a mold table, a mold supported on said table and having a plurality of molding cavities, said table having openings in line with the said cavities, separately mounted plungers disposed beneath the said mold table and adapted to be raised through said openings in said cavities, means for simultaneously raising the said plungers into said cavities and for simultaneously lowering said plungers to a position completely beneath said molding table, and means beneath said mold table for directing cooling fluid upon said plungers.

6. Glass molding apparatus comprising a mold table, a mold supported on said table and having a plurality of molding cavities, said table having openings in line with the said cavities, separately mounted plungers disposed beneath the said mold table and adapted to be raised through said openings in said cavities, means for simultaneously raising the said plungers into said cavities and for simultaneously lowering said plungers to a position completely beneath said molding table, and a nozzle beneath said mold table for directing an air blast upon said plungers.

7. Glass molding apparatus comprising a mold having a plurality of molding cavities, plungers adapted to be raised into said cavities and to be lowered away from said cavities, and means for mechanically reciprocating said plungers comprising a slide having inclined slots formed therein, a support for each of said plungers, and rolls carried by each of said plunger supports and disposed in said slots.

8. Glass molding apparatus comprising a mold having a plurality of molding cavities, plungers adapted to be raised into said cavities and to be lowered away from said cavities, and means for mechanically reciprocating said plungers comprising a stationary member having vertical slots disposed beneath said molding cavities, plunger supports disposed slidably in said slots, rollers carried by said plunger supports, and a rectangular slide having side portions disposed adjacent to said stationary member and having inclined slots formed in said side portions, the said rollers being disposed in said slots.

9. Glass molding apparatus comprising a base, standards carried by said base, a mold table supported upon said standards, a stationary mold portion carried upon said table, two mold sections hinged together and adapted to cooperate with each other and with said stationary mold section to form a plurality of mold cavities and also to form a plunger-receiving cavity communicating with each of said cavities, a pressing plunger adapted to enter said plunger-receiving cavity, a plurality of individual plungers adapted to be raised through openings in said molding table into said molding cavities, and to be lowered completely beneath said molding table, a nozzle disposed beneath said molding table for directing an air blast upon said individual plungers, and means for raising and lowering said individual plungers comprising a stationary member having vertical slots disposed beneath said molding cavities, plunger supports disposed slidably in said slots, rollers carried by said plunger supports, a rectangular slide having side portions disposed adjacent to said stationary member and having inclined slots formed in said side portions, the said rollers being disposed in said slots.

In testimony whereof we, the said MAURICE A. SMITH and JOSEPH BLAZE, have hereunto set our hands.

MAURICE A. SMITH.
JOSEPH BLAZE.